US007004222B2

(12) United States Patent
Ederer et al.

(10) Patent No.: US 7,004,222 B2
(45) Date of Patent: Feb. 28, 2006

(54) DEVICE FOR MANUFACTURING MODELS LAYER BY LAYER

(76) Inventors: Ingo Ederer, Greifenberger Str. 6, D-86911 Pflaumdorf (DE); Rainer Höchsmann, Schloss Str. 16, D-86682 Genderkingen (DE); Bernhard Graf, Valentin-Kindling Str. 1, D-86899 Landsberg (DE); Alexander Kudernatsch, Sauling Str. 39, D-86163 Augsburg (DE)

( * ) Notice: Subject to any disclaimer, the term of this patent is extended or adjusted under 35 U.S.C. 154(b) by 0 days.

(21) Appl. No.: 10/381,550

(22) PCT Filed: Sep. 23, 2001

(86) PCT No.: PCT/DE01/03661

§ 371 (c)(1),
(2), (4) Date: Aug. 7, 2003

(87) PCT Pub. No.: WO02/26420

PCT Pub. Date: Apr. 4, 2002

(65) Prior Publication Data

US 2004/0035542 A1 Feb. 26, 2004

(30) Foreign Application Priority Data

Sep. 26, 2000 (DE) ................................ 100 47 614

(51) Int. Cl.
*B22D 46/00* (2006.01)
*B29C 35/00* (2006.01)

(52) U.S. Cl. .................... 164/155.1; 164/4.1; 164/412; 264/113; 425/145

(58) Field of Classification Search ................. 164/4.1, 164/154.1, 155.1, 412; 264/113; 425/145
See application file for complete search history.

(56) References Cited

U.S. PATENT DOCUMENTS

| | | | |
|---|---|---|---|
| 4,247,508 | A | 1/1981 | Housholder |
| 4,369,025 | A | 1/1983 | von der Weid |
| 4,575,330 | A | 3/1986 | Hull |
| 4,752,352 | A | 6/1988 | Feygin |
| 4,863,538 | A | 9/1989 | Deckard |
| 4,938,816 | A | 7/1990 | Beaman et al. |
| 4,944,817 | A | 7/1990 | Bourell et al. |
| 5,017,753 | A | 5/1991 | Deckard |
| 5,053,090 | A | 10/1991 | Beaman et al. |

(Continued)

FOREIGN PATENT DOCUMENTS

DE 4300478 C1 8/1994

(Continued)

OTHER PUBLICATIONS

Cima et al., "Computer-derived Microstructures by 3D Printing: Bio- and Structural Materials," SFF Symposium, Austin, TX (1994).

(Continued)

*Primary Examiner*—Kuang Y. Lin
(74) *Attorney, Agent, or Firm*—Dobrusin & Thennisch PC

(57) ABSTRACT

The invention relates to a device for manufacturing models layer by layer. The inventive device comprises a frame (1), a vertically adjustable and exchangeable workpiece platform (17)m and a device for feeding the material comprising a coating applicator (4). Said coating applicator (4) serves to feed material from a storage container to a process zone above the workpiece platform (17), said workpiece platform (17) being fixed in the device at least during manufacturing of a model. The workpiece platform (17) is introduced on the one side of the device and extracted on the other side of the device.

17 Claims, 3 Drawing Sheets

U.S. PATENT DOCUMENTS

| | | | | |
|---|---|---|---|---|
| 5,076,869 | A | 12/1991 | Bourell et al. | |
| 5,127,037 | A | 6/1992 | Bynum | |
| 5,132,143 | A | 7/1992 | Deckard | |
| 5,155,324 | A | 10/1992 | Deckard et al. | |
| 5,204,055 | A | 4/1993 | Sachs et al. | |
| 5,252,264 | A | 10/1993 | Forderhase et al. | |
| 5,296,062 | A | 3/1994 | Bourell et al. | |
| 5,316,580 | A | 5/1994 | Deckard | |
| 5,340,656 | A | 8/1994 | Sachs et al. | |
| 5,342,919 | A | 8/1994 | Dickens, Jr. et al. | |
| 5,352,405 | A | 10/1994 | Beaman et al. | |
| 5,382,308 | A | 1/1995 | Bourell et al. | |
| 5,387,380 | A | 2/1995 | Cima et al. | |
| 5,490,962 | A | 2/1996 | Cima et al. | |
| 5,518,680 | A | 5/1996 | Cima et al. | |
| 5,639,402 | A | 6/1997 | Barlow et al. | |
| 5,647,931 | A | 7/1997 | Retallick et al. | |
| 5,658,412 | A | 8/1997 | Retallick et al. | |
| 5,753,274 | A | 5/1998 | Wilkening et al. | |
| 5,807,437 | A | 9/1998 | Sachs et al. | |
| 5,902,441 | A | 5/1999 | Bredt et al. | |
| 5,943,235 | A | 8/1999 | Earl et al. | |
| 5,965,170 | A * | 10/1999 | Matsuoka et al. | 425/174.4 |
| 6,007,318 | A | 12/1999 | Russell et al. | |
| 6,036,777 | A | 3/2000 | Sachs | |
| 6,042,774 | A | 3/2000 | Wilkening et al. | |
| 6,116,517 | A | 9/2000 | Heinzl et al. | |
| 6,147,138 | A | 11/2000 | Hochsmann et al. | |
| 6,155,331 | A | 12/2000 | Langer et al. | |
| 6,193,922 | B1 | 2/2001 | Ederer | |
| 6,217,816 | B1 | 4/2001 | Tang | |
| 6,375,874 | B1 | 4/2002 | Russell et al. | |
| 6,416,850 | B1 | 7/2002 | Bredt et al. | |
| 6,423,255 | B1 * | 7/2002 | Hoechsmann et al. | 264/113 |
| 6,460,979 | B1 | 10/2002 | Heinzl et al. | |
| 6,554,600 | B1 | 4/2003 | Hofmann et al. | |
| 6,610,429 | B1 | 8/2003 | Bredt et al. | |
| 2004/0025905 | A1 | 2/2004 | Ederer et al. | |
| 2004/0026418 | A1 | 2/2004 | Ederer et al. | |
| 2004/0035542 | A1 | 2/2004 | Ederer et al. | |

FOREIGN PATENT DOCUMENTS

| | | |
|---|---|---|
| DE | 4325573 | 2/1995 |
| DE | 29506204.5 | 4/1995 |
| DE | 4440397 | 9/1995 |
| DE | 29701279 | 1/1997 |
| DE | 19511772 C2 | 9/1997 |
| DE | 19846478 | 4/2000 |
| DE | 19853834 | 5/2000 |
| DE | 10047614 | 4/2002 |
| EP | 0361847 | 11/1995 |
| EP | 0 431 924 | 1/1996 |
| EP | 0431924 | 1/1996 |
| EP | 0688262 | 6/1999 |
| EP | 0734842 | 8/1999 |
| FR | 2790418 | 9/2000 |
| WO | WO 00/21736 | 4/2000 |
| WO | WO 02/064353 | 8/2002 |
| WO | WO 02/064354 | 8/2002 |
| WO | WO 03/016030 | 2/2003 |

OTHER PUBLICATIONS

International Search Report, PCT/DE/00/03324, dated May 6, 2001.

International Search Report, PCT/DE01/03662, dated Jan. 3, 2002.

International Search Report, PCT/DE01/03661, dated Feb. 28, 2002.

International Search Report, PCT/DE02/01103, dated Sep. 30, 2002.

Copending National Phase Application, WO 02/26419, dated Apr. 4, 2002 with English Translation (1156-002).

Copending National Phase Application, WO 02/28568, dated Apr. 11, 2002 with English Translation (1156-003).

Copending National Phase Application, WO 02/26478, dated Apr. 4, 2002 with English Translation (1156-004).

Copending National Phase Application, WO 02/083323, dated Oct. 24, 2002 with English Translation (1156-007).

Sachs et al., "Three-Dimensional Printing: Rapid Tooling and Prototypes Directly From a CAD Model", Massachusetts Institute of Technology, pp. 143-151.

Sachs et al., "Three-Dimensional Printing: Rapid Tooling and Prototypes Directly From a CAD Model", Massachusetts Institute of Technology, pp. 131-136.

Williams, "Feasibility Study of Investment Casting Pattern Design by Means of Three Dimensional Printing", Department of Mechanical Engineering, Jun. 5, 1989, pp. 2-15.

Opposition of patent no. DE10047614 (*summary attached*), Jun. 25, 2003.

Gephart, Rapid Prototyping, pp. 118-119 (*summary attached*), 1996.

Marcus et al, Solid Freedom Fabrication Proceedings, Sep. 1993.

EOS Operating Manual for Laser Sintering Machine, Aug. 1999.

EOS Operating Manual for Laser Sintering Machine with brief summary.

* cited by examiner

DEVICE FOR MANUFACTURING MODELS LAYER BY LAYER

This invention relates to a device for pattern building in layers, which has a frame, a vertically movable and interchangeable workpiece platform, and a material feeder with a spreader, whereby the spreader serves to feed material from a storage bin situated in the workspace above the workpiece platform, and the workpiece platform is fixed at least when building a pattern. This invention additionally relates to the application of such a device.

Foundries currently face new challenges in the development of parts. They can counter the increasing time and cost pressures by expanding and becoming full-service businesses offering comprehensive development of the product, ranging from the design through to manufacturing of a casting. This calls for, among others, the integration of new processes. Thus many foundries, for instance, have managed to quickly establish themselves as solid business partners, primarily for the automobile industry, by investing in various rapid prototyping and tooling technologies.

For example, it is known that CAD data can be utilized directly to produce moulds and cores of resin coated moulding sand in a sintering plant. This process is called selective laser sintering. A layer of resin coated moulding sand is deposited on a pre-sintered plate. The energy of a swivelling laser beam is applied to only the sand surfaces to be bonded in this layer. The laser beam heats up the sand layer locally and triggers the resin curing reaction, thereby sintering the moulding sand at those locations. As soon as a layer is finished, the working table sinks about 0.2 mm, and another layer of sand is deposited.

When the building process is complete, the building platform with its sand pack can be dismounted from the machine for mould breakout. Any loose and thermally unsintered sand is removed and the resultant moulds or cores are taken out. Moulds produced in this manner can be used with all common casting materials. The properties of the castings thus represent exactly those of the standard parts manufactured subsequently.

Another process is also known, in which a layer of packable particulate matter is stored in one area on a building base. This entire surface is covered with a binder. An appropriate curing agent is then applied in drops with a movable dispensing device on to a selected subarea of the complete layer of particulate matter and binder. Wherever the curing agent is deposited, the binder and particulates develop a bonded structure. Additional layers are built up by repeating the steps just described. After that, the bonded structure is separated from the loose particulate matter.

Various devices are known in the state of the art for implementing such rapid prototyping processes.

A laser sintering machine is known, for instance, from the German patent DE 198 46 478 A1, which has a sintering chamber in a housing arranged with the optics of a sintering laser and a vertically movable workpiece platform in the building chamber. Also included is a material feeder with a spreader, which feeds powdered sintering material from a storage bin situated in the workspace above the workpiece platform. A job box with a bounding frame can be installed in the sintering chamber, such that the workpiece platform is integrated as a container base, and which includes a carrier fixture like a scissor jack or a carrier arm that acts to support the workpiece platform during operation of the laser.

The upper portion of the job box has holding or hanging means, for example for a crane, so that the job box can be replaced once the pattern has been completed.

In addition, this document also describes how the job box could be slid like a drawer into the processing chamber, for which guides are provided in the sidewalls of the processing chamber.

Systems are also known, in which the job box or the workpiece platform can be placed into the desired device with a forklift or a lift truck.

However, all the systems known in the state of the art and in current practice have the demonstrated disadvantage that the loading and unloading of the workpiece platforms or job boxes require relatively large amounts of time and space.

Hence, it is the object of this invention to develop a device for pattern building in layers, which requires the least possible amount of space, and which makes it possible to reduce the respective time required even further.

According to the invention, this requirement is fulfilled with a device for building patterns of the aforementioned type in layers, in that the workpiece platform is loaded into the device from one side of the device and unloaded from the other side.

Since the workpiece platform can be loaded from one side of the device and unloaded from the other side, the processing time between the building of two patterns can be minimized, in that during the time a workpiece platform is being unloaded, the next workpiece platform can be loaded into the device.

In addition, the space required for such a device can be kept to the very minimum, since no other parts are needed. Also, no manoeuvring room is necessary above the device, for instance, to permit loading and unloading from the top.

The term frame herein refers to any external item that forms a boundary for holding the device, and which also enables parts to be lifted. Nevertheless, this does not exclude the possibility that the device may be essentially closed or that it has an extra closed housing.

If the device has mainly an open frame such as a type of cage for stabilization, it can for example be adapted easily to a range of workpiece platform sizes. Additionally, a frame also provides easy access.

The loading and unloading of a workpiece platform can be achieved with all types of transport means. For example, conveyor belts running through the device could be arranged. However, at least one roller conveyor is the preferred means for loading and unloading the workpiece platform. The use of such a roller conveyor eliminates the need for mobile transport means, like forklifts or lift trucks. Such a roller conveyor should run preferably in a substantially straight line through the device.

Fundamentally, the workpiece platform could have any imaginable shape. Nevertheless, it can be manufactured quite easily and adapted to the device according to the invention, if it has essentially a rectangular or square cross-section in plan view. If in plan view the workpiece platform has essentially a rectangular cross-section, it is loaded and unloaded in a direction with the short side forward, or basically parallel to the long edge of the workpiece platform.

If the vertical positioning of the workpiece platform is achieved with at least one lateral linear guide on the frame, then no guides are required under the workpiece platform. The guides run laterally along the workpiece platform, preferably on the sides that lie mainly parallel to the loading direction. In such a design, the operating position of the device is determined solely by the workpiece platform and the position of the pattern to be built, and not by any guides situated below the workpiece platform for raising it, which would necessitate a much greater operating height.

The loading and unloading of the workpiece plate is also very easy, since precise positioning with additional devices is unnecessary and conveyance into the device is limited.

Due to the fact that the device can be built very compactly, the much stiffer construction method called for consequently makes the device very stable.

The drive means for vertical positioning can be one of many types known to those skilled in the art. It is thus possible, that two lateral shafts with one motor can be used to set the vertical position of the workpiece platform, whereby the motor preferably drives a synchronous belt coupling. The coupling could also be driven by a spur gear and shaft.

Besides this, it is equally conceivable that the vertical positioning is achieved with at least two laterally arranged gear motors, which arrangement does not cause any interference during loading and unloading.

A preferred embodiment of the invention includes two motors connected to each other with a coupling. This coupling could, for example, operate mechanically with a vertical shaft. It is equally conceivable to connect the gear motors electronically in a master/slave operation. Such a coupling reflects the principle of division of work between interdependent systems, whereby the master (the first motor) performs overriding tasks, while the slave (the second motor) performs specific subtasks.

The gear motors are preferably integrated in the device such that they operate a recirculating ball screw, which in turn displaces the lifting plates hinged to the workpiece platform through a spindle nut.

It has very often proven to be advantageous to mount the workpiece platform in a job box such that the entire unit can be loaded in and out of the device.

When the workpiece platform or the job box has a primarily rectangular shape in plan view, it has been found that substantial amounts of non-productive time can be saved if the spreading process with the spreader is conducted over the short side of the workpiece platform. An arrangement of this type clearly leads to time savings.

However, it can occur that depending on the design of the spreader, at least beyond a certain length of spreader such an arrangement results in a noticeable amount of sag, which can no longer be tolerated in the spreading process. Such sagging could be balanced out with an adjustable spreader edge. This spreader edge is preferably made up of a polished steel strip that can be reset at regular intervals with adjustment screws.

Additionally, the adjustment screws can also be used to set the inclination of the steel strip.

The spreading is achieved preferably with a slit spreader having two edges. One edge is for setting the height of the particular material's layer, for example that of the moulding sand, and the second edge defines the spreader's slit width.

In addition, the spreading can also be achieved with a roller spreader. The material is deposited with one roller, which rolls in a direction opposite to that of the spreading direction in the building area, whereby the material is spread out in a thin layer.

Especially in cases where a laser sintering device is utilized, the upper workspace of the frame includes the optics of a sintering laser.

Additionally, it is also conceivable that the upper workspace of the frame includes a dispensing system for spraying fluids and a Drop-On-Demand system, such that the pattern can be built up with a type of inkjet technology.

The device according to the invention has been found to be particularly advantageous for a laser sintering process or a process to build casting patterns from moulding sand, casting resins, and respective curing agents.

The preferred embodiment of the invention will now be explained in more detail with reference to the accompanying drawings, in which:

FIG. 1 represents an embodiment of the device according to the invention, whereby the device could be utilized, for example, to build patterns in layers from moulding sand, casting resins, and curing agents.

Figure 1:
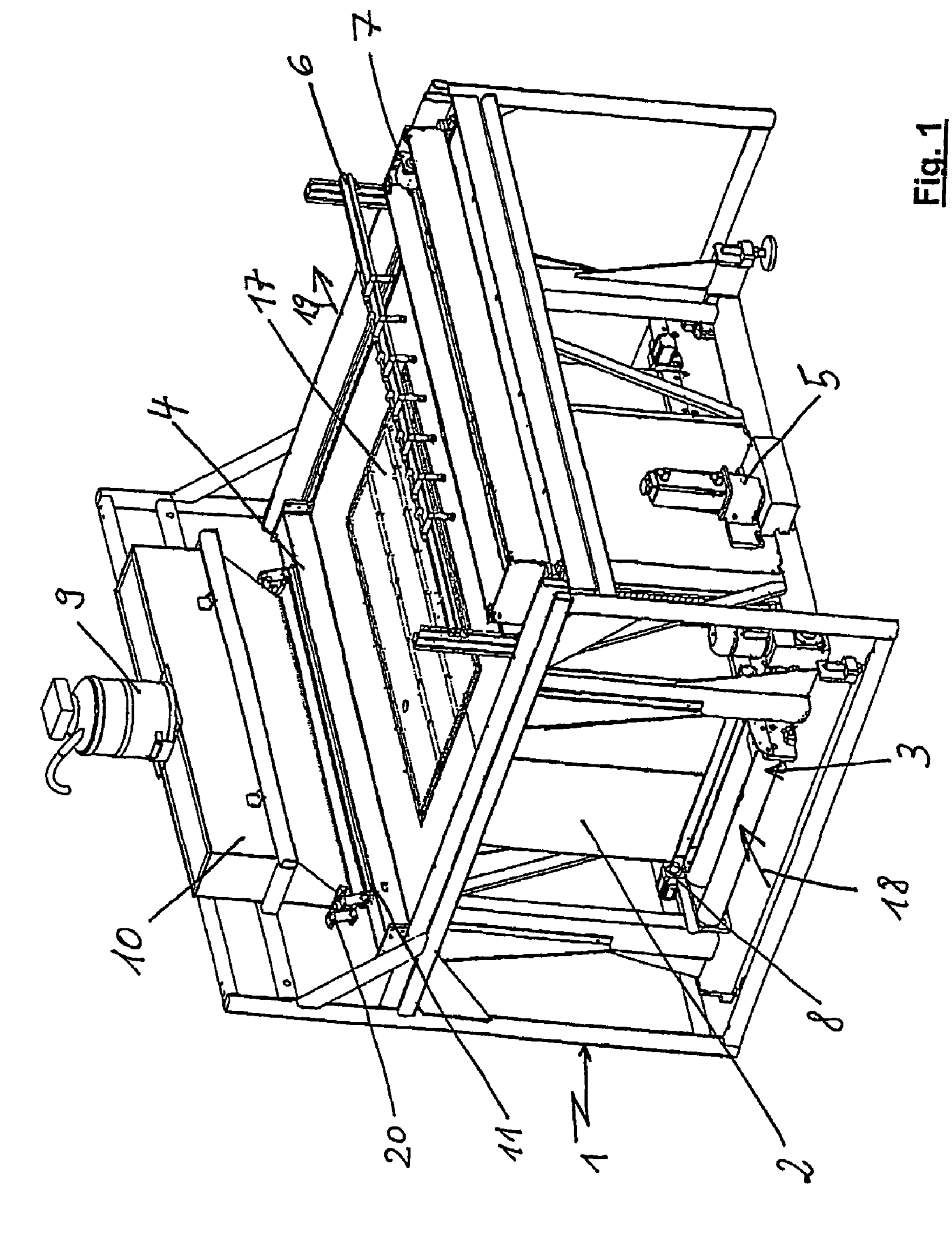
FIG. 1 is a three-dimensional representation of the device according to a preferred embodiment of the invention showing a mounted job box.
Figure 2:
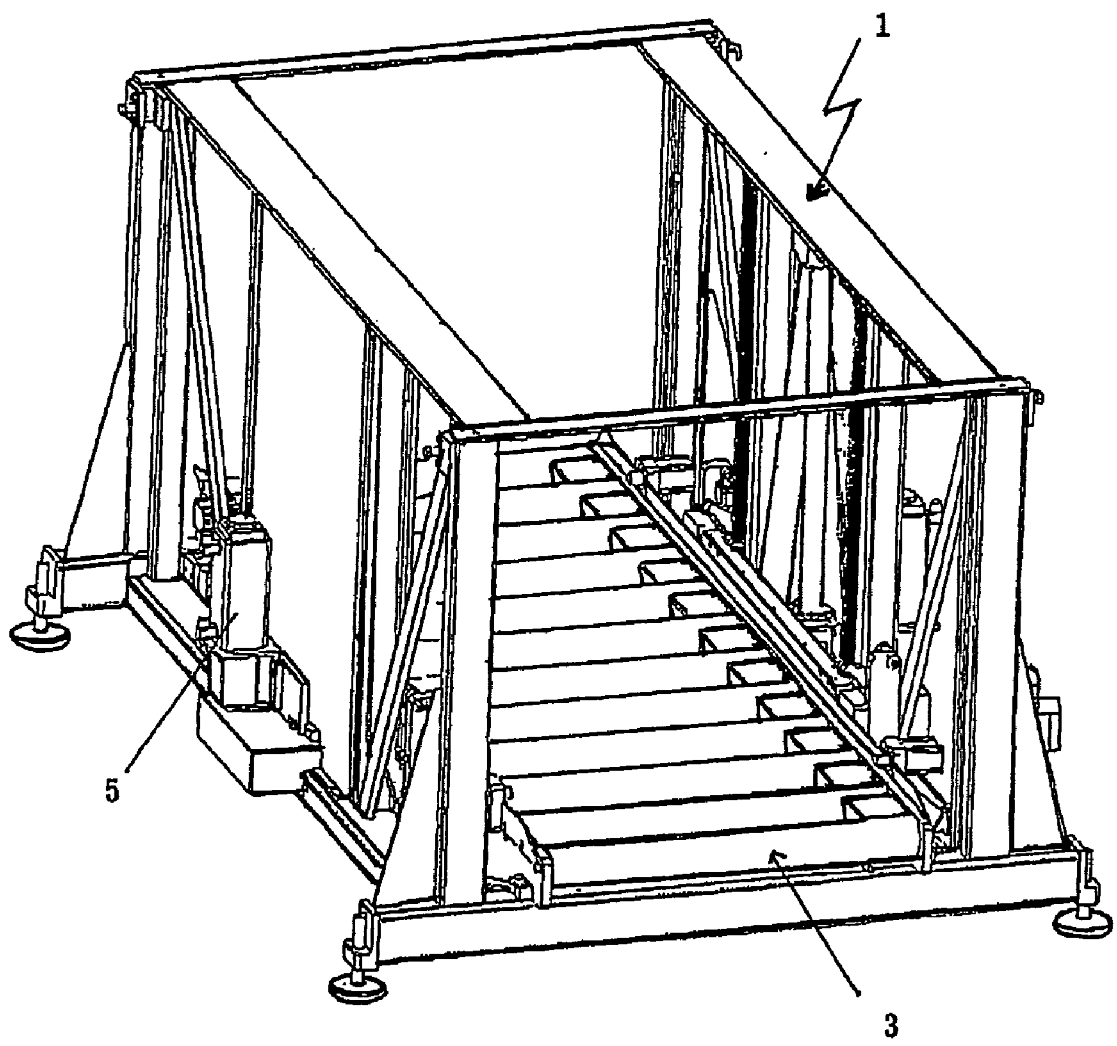
FIG. 2 is a three-dimensional representation of the device depicted in FIG. 1, but without the job box in place.
Figure 3:
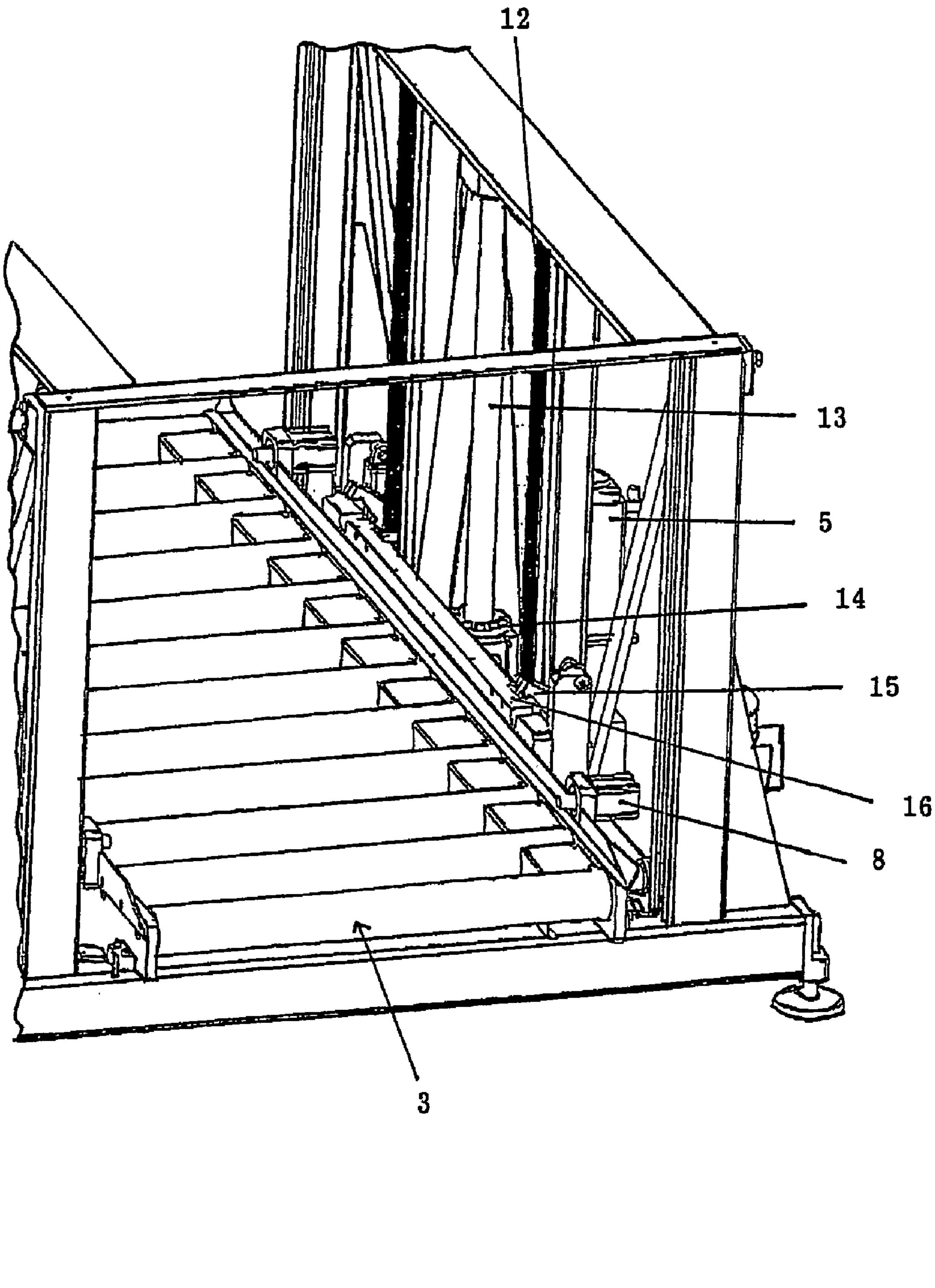
FIG. 3 is a detailed section of the arrangement depicted in FIG. 2.

Another possible embodiment of the invention could just as well be applied in other processes such as selective laser sintering.

The device depicted has a frame 1, which is a type of cage to which other parts are hinged directly or indirectly. The device has a workpiece platform 17 that can be moved vertically essentially in the Z-direction, and which is mounted in job box 2. In plan view, workpiece platform 17 and job box 2 are essentially rectangular in cross-section.

The workpiece platform 17 enclosed in job box 2 of the device as depicted in its preferred embodiment is loaded into the device in the direction shown by arrow 18 and unloaded in the direction shown by arrow 19. It is apparent that frame 1 must have the necessary openings for this purpose.

In order to make it easy to load and unload job box 2, a roller conveyor 3 is included, which runs in a straight line through the device.

Charging of the device according to the preferred embodiment of the invention as illustrated is achieved with roller conveyor 3. This has the advantage that the customer can integrate the device in a space-saving manner into an existing roller conveyor system. Consequently, there is no need locally for any mobile transport means such as forklifts, cranes, or lift trucks.

Since the device can be loaded and unloaded from both sides and since several workpiece platforms 17 and job boxes 2 can be used, the time between building processes can be minimized, since the unloading of one job box 2 can be achieved simultaneously with the loading of the following one from the opposite side.

Following lateral loading of job box 2 and its workpiece platform 17 into the device with the short edge of job box 2 or workpiece platform 17 forward in the loading direction 18, job box 2 is fixed in the loading direction with pneumatically actuated plungers 8.

Additionally, lengthwise along the side of job box 2 are four catches 15, two per side, that engage in workpiece platform 17 from underneath.

The workpiece platform 17 is arranged on catches 15 with conical supports. As such, workpiece platform 17 has appropriate recesses for engaging catches 15. It is preferred to have two conical catches 15 situated diagonally across one another, such that workpiece platform 17 can be mounted into the device in either direction. The two conical supports of catches 15 are designed such that they position workpiece platform 17 precisely. On the other hand, the other two conical supports are flat such that workpiece platform 17 can align itself accordingly. In this way, workpiece platform 17 is mounted horizontally exactly as defined.

The vertical positioning of workpiece platform 17 is achieved with at least one lateral linear guide 12 on frame 1.

Hence, no guides are necessary under workpiece platform 17. The linear guides 12 run laterally to workpiece platform 17 on the sides that are essentially parallel to loading direction 18.

Displacement of workpiece platform 17 is achieved with two motors situated on the sides of frame 1, which operate in a master/slave arrangement over an electronic coupling and drive a recirculating ball screw 13, which in turn displaces two lifting plates 16 through a spindle nut 14. For adjusting the vertical position, each of the two catches 15 situated one on each side, is attached to a lifting plate 16.

After workpiece platform 17 is fixed in the device, it is raised initially to its highest position to prepare it for commencement of the building process.

The upper workspace of the device has a material feeder with a spreader 4. The spreader 4 is for feeding of material, herein moulding sand, out of a storage bin 10 attached firmly to frame 1 and situated in the workspace above workpiece platform 17. The storage bin 10 is supplied with moulding sand by a vacuum feeder 9. The spreader 4 deposits the moulding sand on to workpiece platform 17 in the specified thickness.

The spreader 4 is filled with a vibratory conveyor 11 set into vibratory motion through a pneumatic shaker. The vibratory conveyor 11 is attached to storage bin 10 through flexure joint 20. Shaking of vibratory conveyor 11 causes sand to be conveyed into the appropriately positioned spreader 4.

To be able to convey the moulding sand as uniformly as possible over the full length of vibratory conveyor 11, it is necessary to maintain the same level of sand in storage bin 10. Different levels of sand result in different degrees of pressure on the dispensing slit of vibratory conveyor 11 resulting in the dispensing of accordingly different volumes. Since vacuum feeder 9 fills storage bin 10 in approximately its middle, an appropriate fixture is required to even out the sand level. This is achieved with two screw conveyors that feed from the middle outwards in opposing directions. This approach requires little effort to level out the moulding sand adequately.

As illustrated in FIG. 1, the spreading process with spreader 4 is done along the short edge of the building area as seen in a plan view of a rectangular cross-section of workpiece platform 17. This approach can result in substantial time savings due to the much shorter path to be covered.

However, since spreader 4 can sag noticeably along its length, spreader 4 in its preferred embodiment shown has an adjustable spreader edge that can be adjusted for balancing out any sag.

A dispensing system adapted for spraying fluids 6 is used subsequently to apply a casting resin on to the moulding sand in precisely the desired volume ratio.

Subsequently, the surfaces of the sand-resin mixture to be hardened with an appropriate curing agent are bonded through selective application with a Drop-On-Demand system 7 according to the prior art of an inkjet pressure head.

The workpiece platform 17 is then lowered and the process repeated until the casting pattern is completed. The job box 2 is subsequently unloaded from the device during the simultaneous loading of a new job box 2.

What is claimed is:

1. A device for pattern building in layers, comprising a frame defining a workspace within the frame;

a workpiece platform for defining a building area, and being positioned within the frame and being height adjustable during pattern building for building a metal casting mold in layers;

a storage bin situated in a workspace above the workpiece platform and serving as a source of a feed material including a moulding sand;

a material feeder for delivering the feed material including the moulding sand from the storage bin to the workpiece platform;

a feed material spreader including means for balancing out sag of the spreader along its length; and a dispenser for fluidly spraying a liquid agent to the moulding sand, which is delivered to the workpiece platform, for chemically hardening a resin and moulding sand admixture, wherein the building area is essentially rectangular, and has a pair of longer edges and a pair of shorter edges when viewed from the top, and the spreader is arranged to translate along at least one of the shorter edges of the rectangular cross-section of the workpiece platform.

2. The device of claim 1, further comprising means for loading the workpiece platform loaded into the device from one side and unloading the workpiece platform from another side of the device.

3. The device of claim 2, wherein the means for loading and unloading includes a conveyor.

4. The device of claim 1, further comprising a job box for receiving the workpiece platform.

5. The device of claim 2, further comprising a job box for receiving the workpiece platform.

6. The device of claim 3, further comprising a job box for receiving the workpiece platform.

7. The device of claim 4 including catches associated with the job box for engaging recesses in the workpiece platform from underneath.

8. The device of claim 1, further comprising a vibrating conveyor for dispensing the feed material including the moulding sand.

9. The device of claim 3, further comprising a vibrating conveyor for dispensing the feed material including the moulding sand and a vacuum feeder for delivering the feed material to the storage bin.

10. The device of claim 1, wherein the workpiece platform is interchangeable with at least one other workpiece platform.

11. The device of claim 1, wherein the feed material spreader includes a polished steel strip.

12. The device of claim 3, wherein the feed material spreader includes a polished steel strip.

13. The device of claim 1, wherein the workspace is rectangular in horizontal cross section.

14. The device of claim 3, wherein the workspace is rectangular in horizontal cross section.

15. The device of claim 7, wherein the workspace is rectangular in horizontal cross section.

16. The device of claim 10, wherein the workspace is rectangular in horizontal cross section.

17. A device for building a metal casting patterns in layers, comprising:

a frame defining a rectangular workspace within the frame;

a workpiece platform for defining a building area, which platform is interchangeable with at least one other workpiece platform, being positioned within the frame and being height adjustable during operation for building a metal casting patterns in layers;

at least one motor for adjusting the height of the workpiece platform during operation;

a storage bin situated in a workspace above the workpiece platform and serving as a source of a feed material including a moulding sand;

a material feeder for vibratingly delivering the feed material including the moulding sand from the storage bin to the workpiece platform;

a steel strip feed material spreader including means for balanced out to prevent sag of the spreader along its length; and an ink-jet dispenser for spraying an agent to the moulding sand on the workpiece platform, for chemically hardening a resin and moulding sand admixture, wherein the building area is essentially rectangular, and has a pair of longer edges and a pair of shorter edges when viewed from the top, and the spreader is arranged to translate along at least one of the shorter edges of the rectangular cross-section of the workpiece platform.

* * * * *